United States Patent [19]
Bolton

[11] Patent Number: 5,960,500
[45] Date of Patent: Oct. 5, 1999

[54] STOCK WASHER FOR WASHING, THICKENING AND CLASSIFYING SOLIDS

[75] Inventor: Joseph A. Bolton, Queensbury, N.Y.

[73] Assignee: Thermo Fibertek Inc., Waltham, Mass.

[21] Appl. No.: 09/132,601

[22] Filed: Aug. 11, 1998

Related U.S. Application Data

[62] Division of application No. 08/678,478, Jul. 9, 1996.

[51] Int. Cl.[6] ................................................. D06B 1/02
[52] U.S. Cl. ................................. 8/156; 8/181 R; 162/60
[58] Field of Search ............................ 68/181 R; 8/156; 210/406; 162/60

[56] References Cited

U.S. PATENT DOCUMENTS

| | | | |
|---|---|---|---|
| 2,506,882 | 5/1950 | Lipscomb | 8/156 |
| 5,221,434 | 6/1993 | Henricson | 162/52 |
| 5,259,955 | 11/1993 | Bolton | 210/406 |
| 5,688,369 | 11/1997 | Landmark et al. | 162/57 |
| 5,771,718 | 6/1998 | Ide et al. | 68/142 |

*Primary Examiner*—Frankie L. Stinson
*Attorney, Agent, or Firm*—Kane,Dalsimer,Sullivan,Kurucz, Levy, Eisele and Richard, LLP

[57] ABSTRACT

The apparatus is a washer, thickener and classifier for recovering solids from liquids including a truncated conical screen with walls typically sixty degrees from the horizontal and formed of filter media. Stock sprayer assemblies rotate about a longitudinal axis of said conical screen and direct stock, particularly deink paper stock, onto the walls of the conical screen. Wash fluid sprayer assemblies, including high impact shower nozzles, direct wash fluid onto the stock on the walls of the conical screen. The wash fluid cleans the stock, with the unwanted solids and contaminants passing through the conical screen to the discharge pipes. The wash fluid similarly washes the cleaned stock through the exit formed at the truncated portion formed at the apex of the conical screen for subsequent processing.

2 Claims, 5 Drawing Sheets

STOCK WASHER FOR WASHING, THICKENING AND CLASSIFYING SOLIDS

This Application is a Divisional of Ser. No. 08/678,478 filed Jul. 9, 1996.

BACKGROUND OF THE INVENTION

1. Field of the Invention

This invention pertains to a device for washing, thickening and/or classifying fluid-borne solids. An example of its use is washing and thickening deinked fibers used in pulp and paper waking. The washer uses a rotary joint with alternating rows of stock sprayers and wash fluid sprayers directed toward a stationary conical screen.

2. Description of the Prior Art

In the prior art, it is well-known to use belt-type, drum-type and other washers for washing and thickening solids in amongst others, the mining industry, industrial and municipal waste treatment and in the paper manufacturing process, particularly to remove fines, inks and fillers from the deinked stock.

In belt-type washers and thickeners, it is well-known to spray stock into the nip of a high speed roll and fabric. Centrifugal force causes the fine fractions, including contaminants and excess, liquid to pass through the fabric with the washed stock retained on the surface. Doctor blades are then used to remove the washed stock from the high speed rolls.

In drum-type washers and thickeners, whether gravity or vacuum based, it is well-known to allow the fine fractions, including contaminants and excess liquid to pass through the fabric or drum.! washed and thickened stock is couched from the drum. Many prior: art drum washers have multiple stages.

U.S. Pat. No. 5,259,955 entitled "Vacuum Strainer" to Bolton, the present inventor, uses a conical screen as a filter for solids and liquids within a common stream, but is different from the present invention in the manner in which the incoming stock is applied to the screen. U.S. Pat. No. 5,453,193 to Maher et al., entitled "Strainer", commonly assigned with the present application, uses an overflow weir to deposit incoming stock. A weir will not uniformly distribute the feed flow at feed consistencies encountered in many washing, thickening and classifying applications. Moreover, the present invention allows for higher flow rates per unit screen area.

OBJECTS AND SUMMARY OF THE INVENTION

The invention will be described in terms of its application in the pulp and paper industry as an example.

It is therefore an object of this invention to provide a pulp washer, thickener and classifier for a paper-making process, particularly a washer, thickener and classifier of deinked stock, which is of a mechanical design with increased reliability.

It is therefore a further object of this invention to provide a pulp washer for a paper-making process, particularly a washer, thickener and classifier of deinked stock, which is of decreased expense to manufacture, to install and to operate.

It is therefore a still further object of this invention to provide a pulp washer for a paper-making process, particularly a washer, thickener and classifier of deinked stock, which can operate under high solids loads.

It is therefore a final object of this invention to provide a pulp washer for a paper-making process, particularly a washer, thickener and classifier of deinked stock, which can operate under high standards as to the percentage of fines, inks, fillers and other contaminants which must be removed and to recover high quality fiber.

The apparatus of the present invention uses a stationary forty-five degree to seventy degree conical screen with an assembly of stock sprayers and process water sprayers therein. Alternating rows of sprayers for stock and process water are affixed to a rotary joint. The sprayers for the process water include high impact shower nozzles. The stock, which initially includes fines, inks, fillers and other contaminants, is sprayed against the conical screen by the stock sprayers and is subsequently washed by water from high impact shower nozzles, typically at 50 psi to 200 psi to keep the conical screen from plugging. The water from the high impact shower nozzles cleans the stock which has been sprayed against the conical screen. The water passes through the conical screen along with the fines, inks, fillers and other contaminants from the stock. The useful fiber sprayed against the screen can not pass through the screen's fine openings and is washed and transported out an exit at the truncated bottom of the conical screen.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
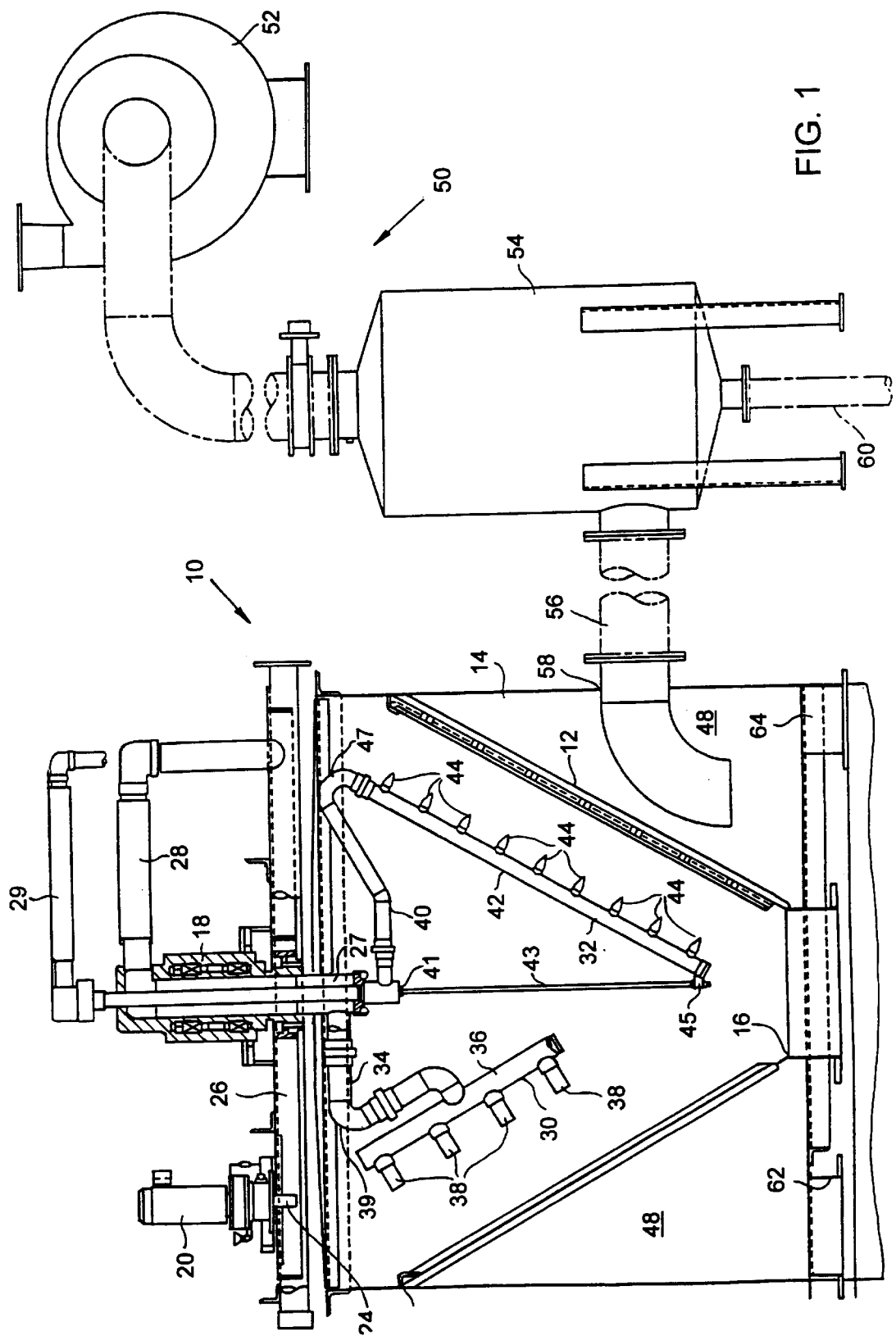
FIG. 1 is a side view, partially in cross-section, of the apparatus of the present invention.

Referring now to the drawings in detail wherein like numerals indicate like elements throughout the several views, one sees that FIG. 1 is a side view, partially in cross-section, of the pulp washer 10 of the present invention. Truncated conical screen 12, typically made of 60 mesh to 250 mesh equivalent synthetic or metallic bonded filter media, is supported by cylindrical housing 14. The conical screen 12 has walls typically 45° to 70° from the horizontal. Stock exit 16 is formed from the lower truncated portion or apex of conical screen 12.

Figure 3:
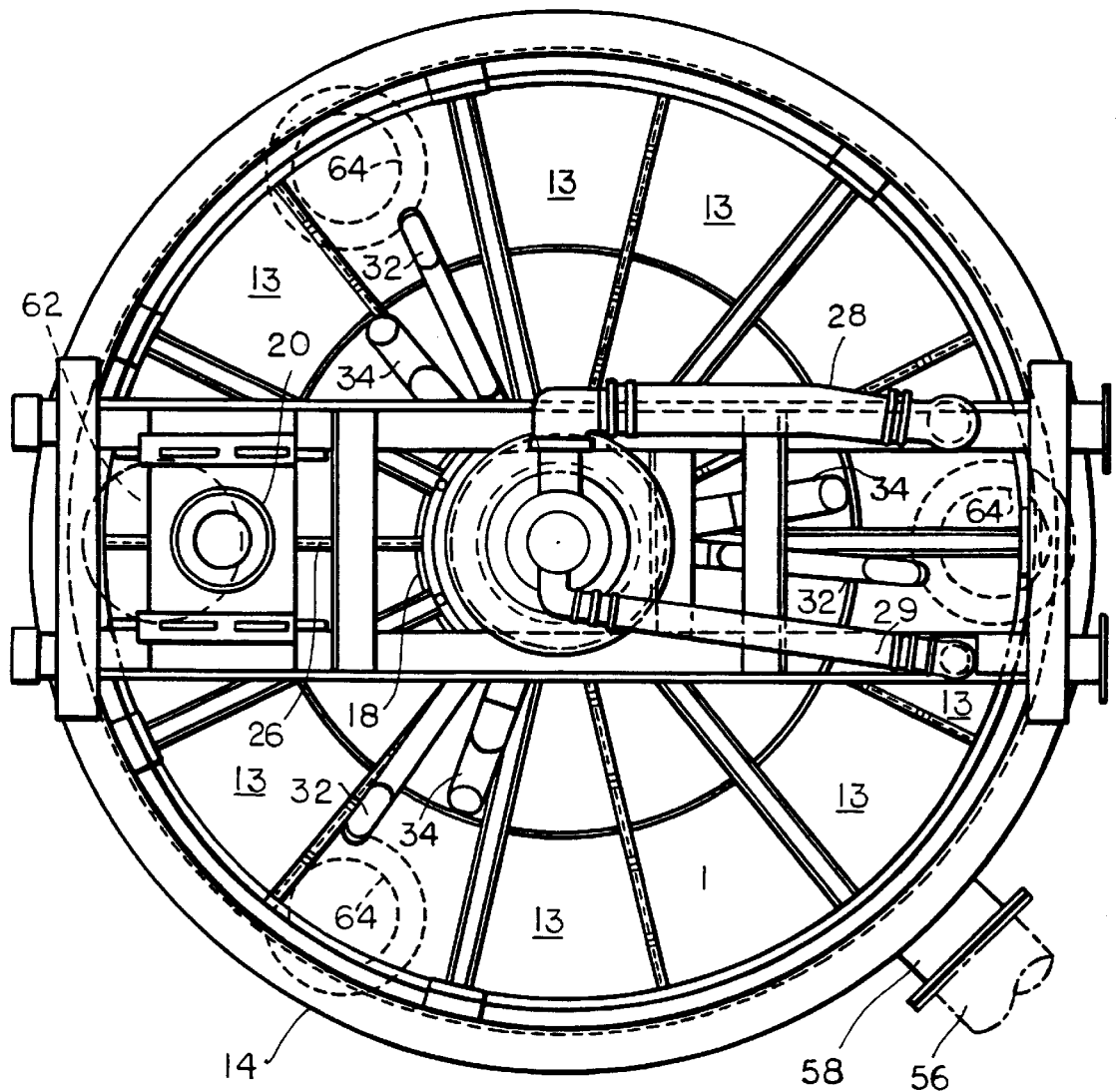
FIG. 3 is a top plan view of the apparatus of the present invention.

As shown in FIG. 3, conical screen 12 is typically implemented as a series of planar pie-like portions 13.

As shown in FIG. 1, rotary joint 18 is positioned along an upward projection of a longitudinal axis 19 of conical screen 12. Driver assembly 20, which includes a motor, reducer, pulley, drive belt and similar mechanical components is positioned upwardly and inwardly from a periphery of the upper portion 22 of conical screen 12. Driver assembly 20 includes a downwardly pointing rotary output shaft 24 which is in mechanical communication with rotary joint 18, and causes rotation thereof about longitudinal axis 19, via mechanical assembly 26.

Rotary joint 18 supports two concentric inlet pipes, outer stock supply pipe 28 which receives paper stock (such as deink stock) typically at 5 psi to 100 psi, and inner water shower supply pipe 29 which receives water, typically process water, at 50 psi to 200 psi.

Figure 4:
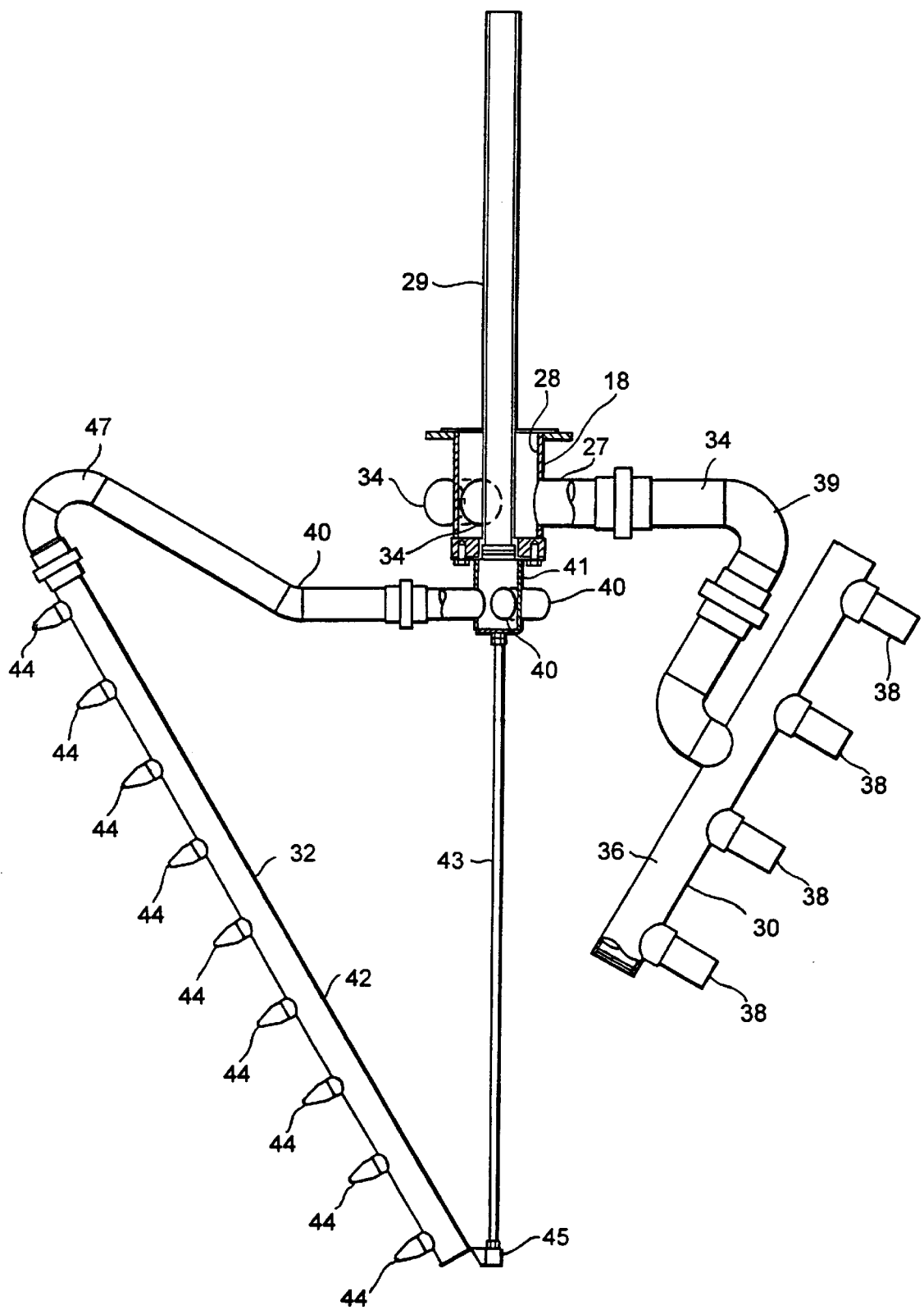
FIG. 4 is a side plan view of the sprayer assembly of the present invention.

Rotary joint 18 is mechanical communication with alternating rows of stock sprayers 30 and water sprayers 32 (also see FIG. 3–5) which rotate therewith. Stock sprayers 30 are formed of an arcuate shaped arm pipe 34 to receive stock from outer stock supply pipe 28 via stock inlet port 27 and feed the stock to stock header assembly 36 which is inwardly substantially parallel from the wall of truncated conical screen 12. Stock header assembly 36 includes a plurality of fan nozzles 38 oriented to impinge the stock flow against the conical screen 12 at an angle which is adjustable. The optimum angle of impingement is determined for each application as a balance between washing efficiency, flow capacity and classification efficiency. The angle is adjusted using pipe union 39. Similarly, water sprayers 32 include an arcuate shaped arm pipe 40 to receive water, typically process water at 50 psi to 200 psi, from inner water shower supply pipe 29 via water inlet port 41 and feed the water to water header assembly 42 which is substantially parallel from the wall of truncated conical screen 12. Water header assembly 42 includes a plurality of high impact shower nozzles 44 oriented perpendicular to conical screen 12 to spray the water thereon to wash the stock on conical screen 12. The water header assemblies 42 are supported by vertical support member 43 which runs from the lower portion of water inlet port 41 along longitudinal axis 19 to a distal portion 45 of water header assemblies 42. The water is sprayed on the stock and the conical screen 12 both to keep the conical screen 12 from plugging and to wash the inks, fines and fillers from the stock to area 48 formed between the conical screen 12 and the cylindrical housing 14. Additionally, the water washes the cleaned stock from the conical screen 12 and out through the stock exit 16 formed from the lower truncated portion of conical screen 12. The angle of impingement of the high impact shower nozzles 44 is adjustable using pipe union 47. The optimum angle of impingement for the high impact shower nozzles 44 is determined for each application as a balance between washing efficiency, flow capacity and classification efficiency. The thickened stock is then sent to the subsequent step of the paper-making process.

A low head vacuum source 50 comprised of centrifugal exhaustor 52 and separator 54 is in communication with area 48 via pipe 56 and aperture 58 in cylindrical housing 14. Additionally, pipe 60 leads from the lower portion of separator 54 to a seal tank (not shown). The centrifugal exhauster 50 is used to induce a vacuum under conical screen 12 further facilitating the removal of fines, fillers and inks. The vast majority of the fines, fillers and inks, along with quite a bit of water, is passed through discharge pipe 62 at a lower outer periphery of cylindrical housing 14.

Figure 2:
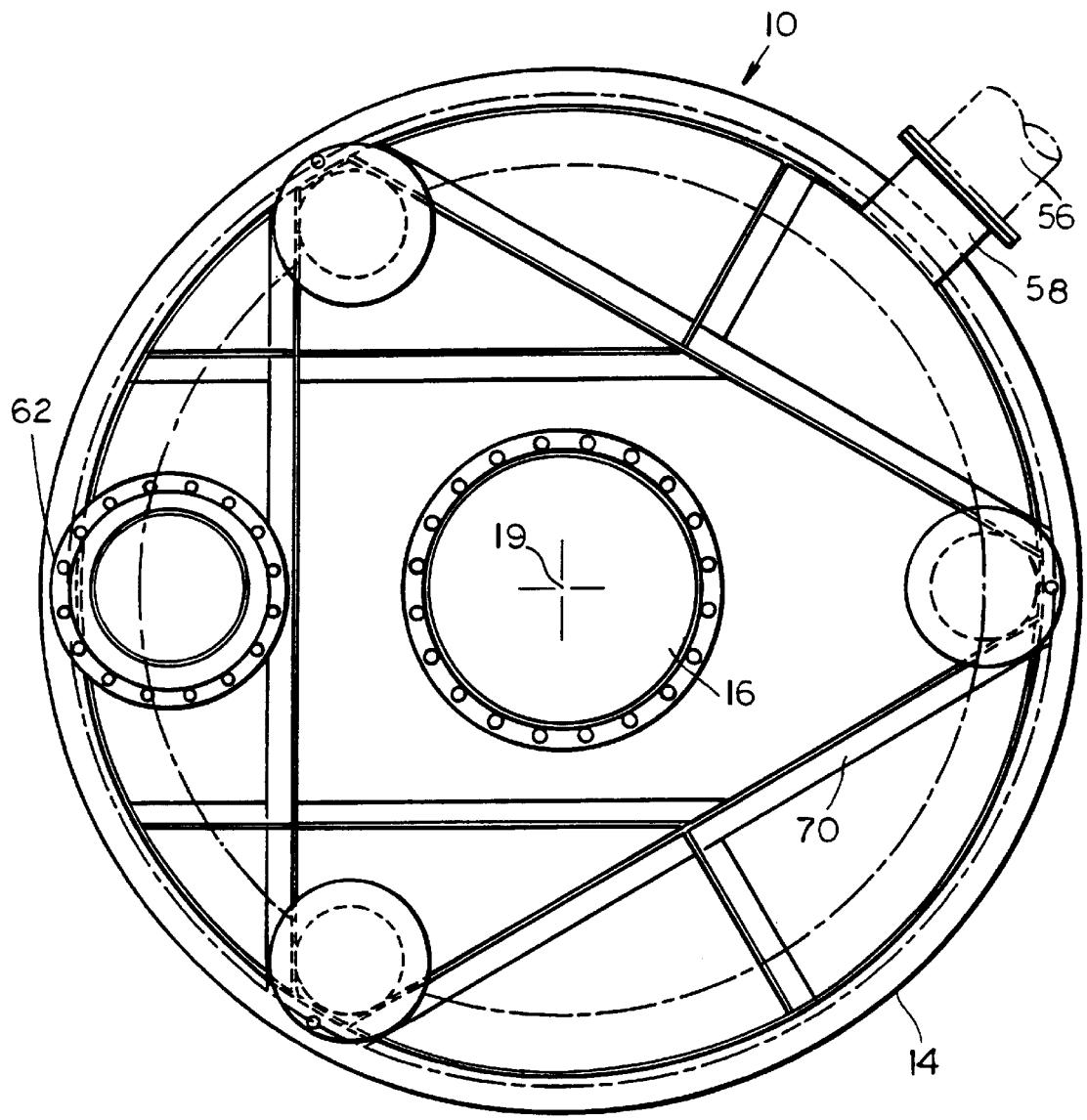
FIG. 2 is a bottom plan view of the apparatus of the present invention.

FIG. 2 is a bottom view of pulp washer 10, showing in particular the stock exit 16, the discharge pipe 62, the pipe 56 through aperture 58 leading to the centrifugal exhauster 52 (not shown in FIG. 1). Additionally, various mechanical support structures 70 are illustrated.

Figure 5:
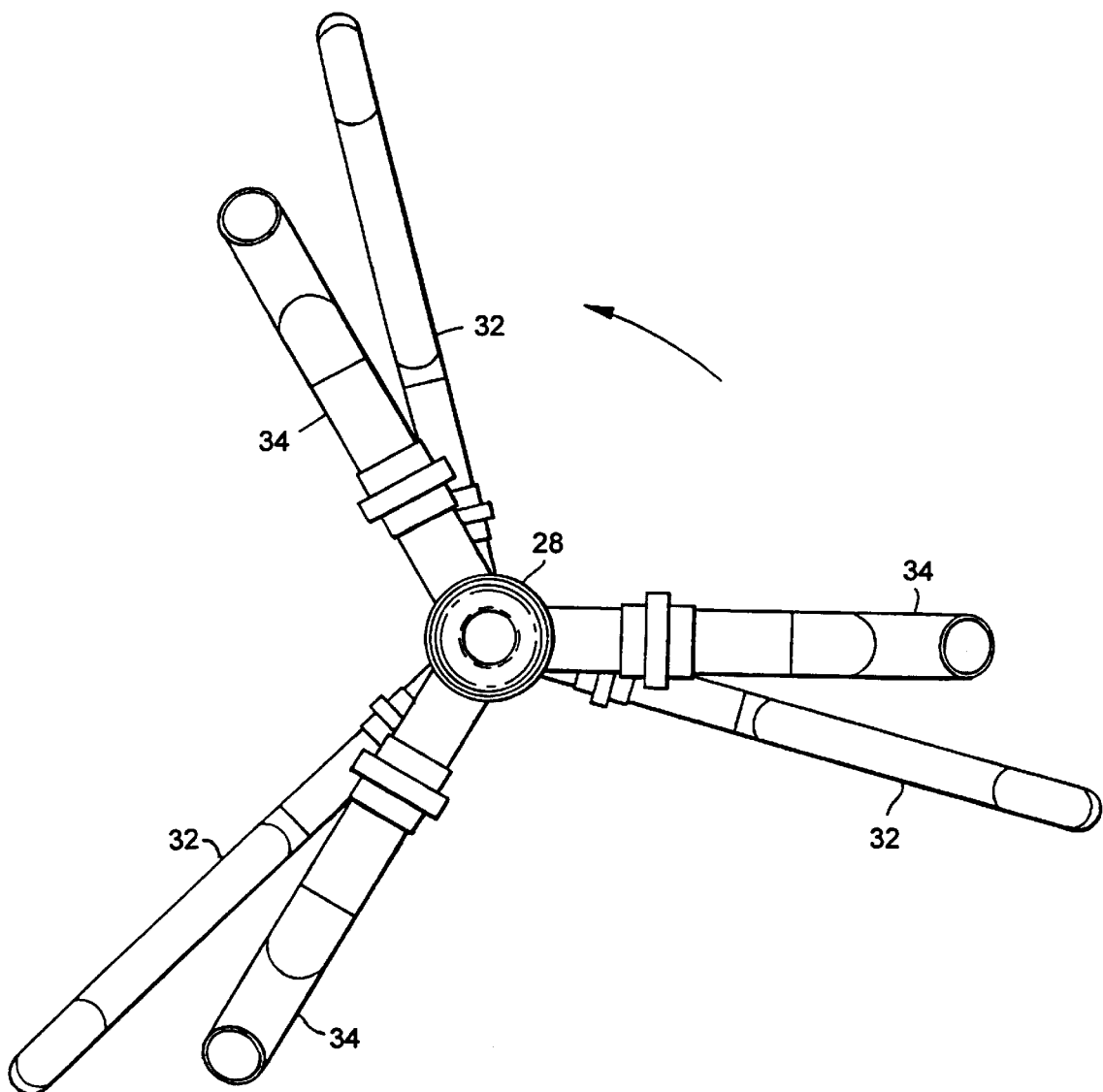
FIG. 5 is a top plan view of the sprayer assembly of the present invention.

The number of water sprayers 32 and stock sprayers 30 will vary from one to four of each depending upon flow rates and the amount of washing desired. As shown in FIGS. 3 and 5, there are typically three water sprayers 32 and three stock sprayers 30. The water sprayers 32 are spaced 120° from each other as are the stock sprayers 30. The stock sprayers 30 are typically positioned at a 15° to 75° phase angle ahead of water sprayers 32 in the direction of rotation (shown as counterclockwise in FIG. 3) so that the stock or pulp on conical screen 12 is sprayed immediately with the high impact shower nozzles 44 (shown in FIGS. 1 and 4). The phase angle is adjustable using the flange connection of the stock supply pipe 28. The optimum phase angle is determined for each application as a balance between washing efficiency and capacity.

To use pulp washer 10, the user supplies stock to outer stock supply pipe 28 and water to inner water shower supply pipe 29. Additionally, the user activates driver assembly 20 and centrifugal exhauster 50. The rotary joint 18 rotates in response to driver assembly 20 and rotates alternating rows of stock sprayers 30 and water sprayers 32. Stock is sprayed onto conical screen 12, and then water from high impact shower nozzles 44 cleans the stock and prevents the conical screen 12 from plugging. The fines, fillers, inks and similar contaminants pass through conical screen 12 to area 48 formed between the conical screen 12 and cylindrical housing 14 where they are evacuated through discharge pipe 62. The water further serves to direct the washed pulp to the lower portion of conical screen 12 and out through stock exit 16 for subsequent processing.

Thus the several aforementioned objects and advantages are most effectively attained. Although a single preferred embodiment of the invention has been disclosed and described in detail herein, it should be understood that this invention is in no sense limited. thereby and its scope is to be determined by that of the appended, claims.

What is claimed is:

1. A method for washing, thickening and classifying stock including the steps of:

spraying stock onto a conical screen having a lower portion forming an exit thereto;

spraying wash liquid onto said conical screen thereby washing contaminants from said stock through said conical screen;

said step of spraying wash liquid further urging said stock through the exit in said conical screen.

2. The method for washing, thickening and classifying stock of claim 1 further including the step of using rotary apparatus for said steps of spraying stock and spraying wash fluid.

* * * * *